(12) United States Patent
Eldredge et al.

(10) Patent No.: US 8,930,126 B2
(45) Date of Patent: Jan. 6, 2015

(54) SYSTEMS AND METHODS FOR FUEL CONSUMPTION ANALYSIS

(75) Inventors: David A. Eldredge, Melbourne, FL (US); Yi Chen, Boston, MA (US); Jerod Svidunovich, Melbourne, FL (US); Timothy Robert Brown, Erie, PA (US); John W. McElroy, Melbourne, FL (US)

(73) Assignee: General Electric Company, Schenectady, NY (US)

( * ) Notice: Subject to any disclaimer, the term of this patent is extended or adjusted under 35 U.S.C. 154(b) by 57 days.

(21) Appl. No.: 13/600,398

(22) Filed: Aug. 31, 2012

(65) Prior Publication Data
US 2014/0067246 A1    Mar. 6, 2014

(51) Int. Cl.
*G06F 19/00* (2011.01)
*B61L 3/00* (2006.01)

(52) U.S. Cl.
CPC ............. *B61L 3/006* (2013.01); *B60L 2200/26* (2013.01)
USPC ........................................ 701/123

(58) Field of Classification Search
CPC ... B61L 3/006; B61L 2205/04; B61L 25/021; B61L 25/026; B61L 3/008; B60L 2200/26; Y02T 10/7258; B60R 16/0236; G05D 1/005
USPC ........................ 701/19, 20, 123, 103; 180/335
See application file for complete search history.

(56) References Cited

U.S. PATENT DOCUMENTS

| | | | |
|---|---|---|---|
| 2007/0219682 A1* | 9/2007 | Kumar et al. | 701/19 |
| 2008/0183345 A1* | 7/2008 | Chandra et al. | 701/19 |
| 2008/0201028 A1* | 8/2008 | Brooks et al. | 701/20 |
| 2009/0299555 A1* | 12/2009 | Houpt et al. | 701/19 |
| 2010/0262321 A1* | 10/2010 | Daum et al. | 701/20 |
| 2011/0060486 A1 | 3/2011 | Meltser | |
| 2012/0089537 A1 | 4/2012 | Cooper | |

* cited by examiner

*Primary Examiner* — Mary Cheung
(74) *Attorney, Agent, or Firm* — GE Global Patent Operation; John A. Kramer

(57) ABSTRACT

A system includes a vehicle control module, an operating information module, and a fuel analysis module. The vehicle control module is configured to obtain a trip plan for the vehicle. The operating information module is configured to be disposed on-board the vehicle and to autonomously obtain operating information describing one or more of tractive events or braking events performed during the trip. The fuel analysis module is configured to be disposed on-board the vehicle, to receive the operating information from the operating information module, and to autonomously determine a fuel consumption for at least a portion of the trip using the operating information received from the operating information module.

25 Claims, 4 Drawing Sheets

SYSTEMS AND METHODS FOR FUEL CONSUMPTION ANALYSIS

FIELD

Embodiments of the subject matter described herein relate to systems and methods for the analysis of fuel consumption for vehicles traveling in a transportation network.

BACKGROUND

A transportation network for vehicles can include several interconnected main routes on which separate vehicles travel between locations. For example, a transportation network may be formed from interconnected railroad tracks with rail vehicles traveling along the tracks. The vehicles may travel according to schedules that dictate where and when the vehicles are to travel in the transportation network. The schedules may be coordinated with each other in order to arrange for certain vehicles to arrive at various locations in the transportation network at desired times and/or in a desired order. Each vehicle traveling through the network may also be controlled according to a pre-set plan for accomplishing a mission being performed by the vehicle.

Fuel is a large expense for a railroad. Continued improvement in fuel efficiency is important to minimizing operating costs as well as to reducing emissions for regulatory purposes. New technologies or initiatives may be developed to reduce fuel consumption. One problem encountered with new technologies or initiatives that seek to reduce fuel consumption and/or emission generation is that it can be difficult to evaluate or quantify the effectiveness of such initiatives due to difficulties in measuring fuel consumed by a vehicle or vehicles using the new technology or initiative.

In certain current attempts to evaluate fuel savings, each locomotive of a train separately transmits information to an off-board recipient regarding the operation of that particular locomotive for off-board processing. Such off-board processing is done retrospectively after the data has been transmitted and stored, and can involve human entry and/or computation of fuel consumption. The reporting process alone may take days as locomotives come into range and report. In addition to the time consumed and errors caused by such entry, additional errors due to improper correlation of data also reduce the quality of current fuel consumption computations. For example, to understand how much fuel is used between two given points, data sent from a locomotive may be combined with data from an automatic equipment identification (AEI) reader, with information from the two devices correlated by a time stamp. However, a time stamp from a locomotive from which data is sent may not correlate with a time stamp from the AEI reader, thus resulting in an error in the location or route being evaluated.

Also, if one locomotive encounters a communication problem, then the data for the entire train may be incomplete and thereby compromised. Further, because of the number of sources and potential for error in current systems, large sets of data are required to have an acceptable level of confidence in the results. However, it may take a considerable amount of time to accumulate enough data to have reliable results. Thus, it may take, for example, several months before it is known if a given technology or technique is effective in reducing fuel consumption, or how much fuel is saved by a given technique or techniques.

Thus, current systems have a large amount of inaccuracy as well as an undesirable time lag before results are known with an acceptable level of confidence. These problems may compound each other, as the inaccuracy requires more trips to be taken to have any level of confidence, with the required additional trips resulting in an even greater time lag.

A need exists for improved analysis of fuel consumption.

BRIEF DESCRIPTION

In one embodiment, a system includes a vehicle control module, an operating information module, and a fuel analysis module. As used herein, the terms "system" and "module" include a hardware and/or software system that operates to perform one or more functions. For example, a module or system may include a computer processor, controller, or other logic-based device that performs operations based on instructions stored on a tangible and non-transitory computer readable storage medium, such as a computer memory. Alternatively, a module or system may include a hard-wired device that performs operations based on hard-wired logic of the device. The modules shown in the attached figures may represent the hardware that operates based on software or hard-wired instructions, the software that directs hardware to perform the operations, or a combination thereof.

The vehicle control module is configured to be disposed on-board a vehicle and to obtain a trip plan for the vehicle. The trip plan designates one or more tractive operations or braking operations to be implemented by the vehicle during a mission, such as a trip. The operating information module is configured to be disposed on-board the vehicle and to autonomously obtain operating information describing one or more of actual tractive events or actual braking events performed during the trip. The fuel analysis module is configured to be disposed on-board the vehicle and to receive the operating information from the operating information module. The fuel analysis module is also configured to autonomously determine a fuel consumption for at least a portion of the trip using the operating information received from the operating information module. In embodiments, the fuel analysis module is communicatively coupled with the operating information module via a communication link.

In another embodiment, a method includes obtaining operating information on-board a vehicle. The operating information describes one or more of tractive events or braking events during a mission being performed by the vehicle. The method also includes communicating the operating information to a fuel analysis module disposed on-board the vehicle. The method further includes determining, autonomously on-board the vehicle during the mission, a fuel consumption for at least a portion of the mission using the operating information.

In another embodiment, a tangible and non-transitory computer readable medium (e.g., for autonomously determining fuel consumption) includes one or more software modules configured to direct a processor to obtain operating information on-board a vehicle. The operating information describes one or more of tractive events or braking events during a mission being performed by the vehicle. The processor is also directed to communicate the operating information to a fuel analysis module disposed on-board the vehicle. Further, the processor is directed to determine, autonomously on-board the vehicle during the mission, a fuel consumption for at least a portion of the mission using the operating information.

BRIEF DESCRIPTION OF THE DRAWINGS

The present inventive subject matter will be better understood from reading the following description of non-limiting embodiments, with reference to the attached drawings, wherein below.

DETAILED DESCRIPTION

One or more embodiments of the inventive subject matter described herein provide methods and systems for determining, for example autonomously, fuel consumption of, for example, a powered unit or a vehicle. The fuel consumption determining activities may cooperate with or be integrated with certain control activities of the vehicle, such as designating or implementing tractive or braking efforts.

A technical effect of embodiments includes providing better quality of information regarding fuel consumption, for example, to evaluate one or more fuel efficiency technologies, techniques, or initiatives. (For example, a technical effect may include selecting and/or improving upon one or more fuel efficiency technologies, techniques, or initiatives based on the better quality of information, and controlling a vehicle or other system based on the one or more fuel efficiency technologies, techniques, or initiatives that is selected and/or improved upon, from a first state where the vehicle or other system exhibits a first fuel efficiency to a different, second state where the vehicle or other system exhibits a better, second fuel efficiency.) An additional technical effect of embodiments includes providing fuel consumption information more quickly. A still further additional technical effect of embodiments is to prevent or minimize errors caused by interruption in communications between on-board and off-board systems, and/or errors caused by correlation errors between devices, and/or errors caused by data entry. A still further technical effect of embodiments includes reducing the quantity of fuel consumption information required to evaluate fuel efficiency studies. Yet still further technical effects of embodiments include reducing off-board processing requirements and time-consuming human entry.

Figure 1:
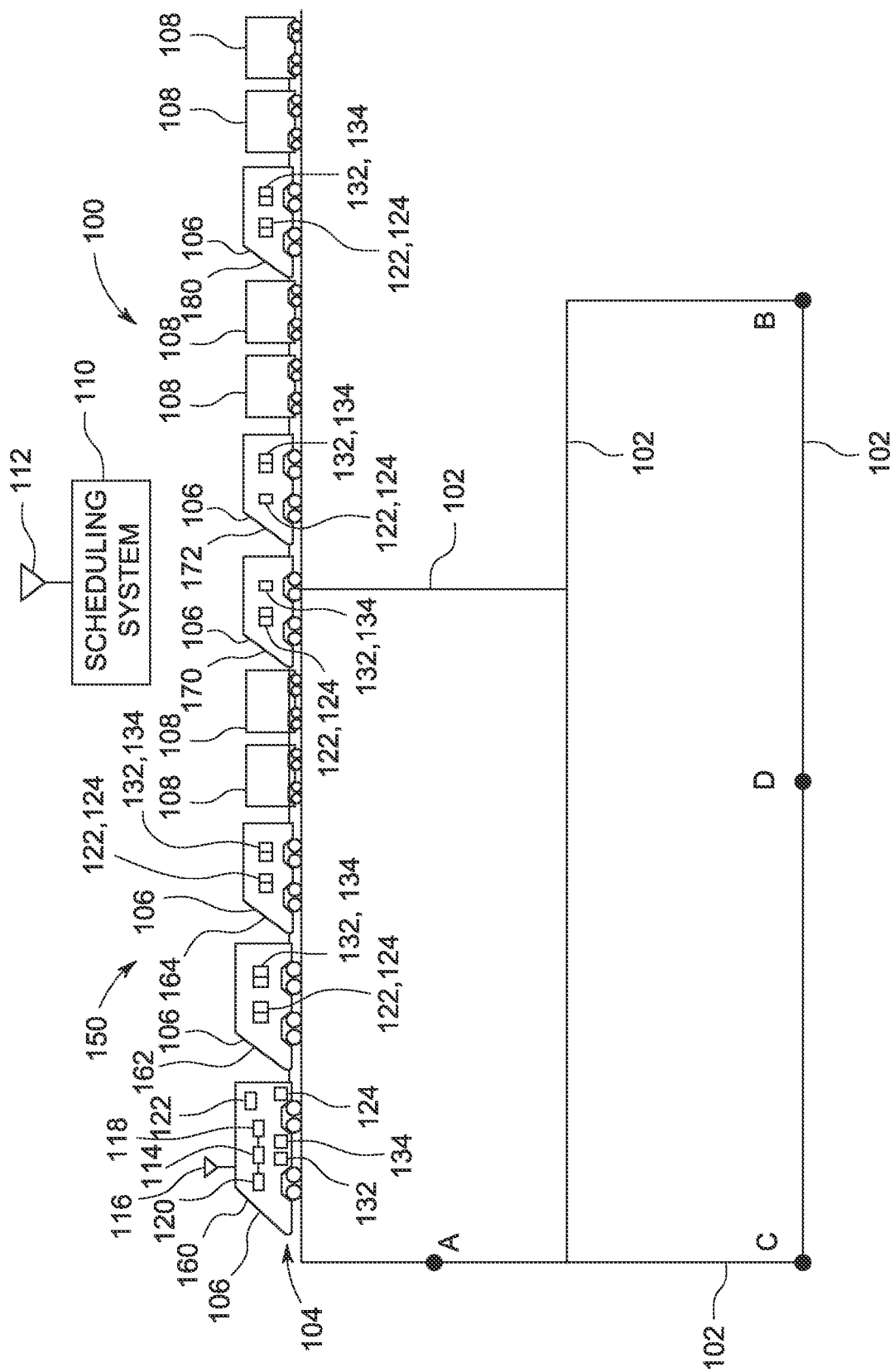
FIG. 1 is a schematic diagram of one embodiment of a transportation network.

FIG. 1 is a schematic diagram of one embodiment of a transportation network 100. The transportation network 100 includes a plurality of interconnected routes 102, such as railroad tracks, roads, waterways, airborne paths, or other paths across which vehicles travel. The transportation network 100 may extend over a relatively large area, such as hundreds of square miles or kilometers of land area. While only one transportation network 100 is shown in FIG. 1, one or more other transportation networks 100 may be joined with and accessible to vehicles traveling in the illustrated transportation network 100. For example, one or more of the routes 102 may extend to another transportation network 100 such that vehicles can travel between the transportation networks 100. Different transportation networks 100 may be defined by different geographic boundaries, such as different towns, cities, counties, states, groups of states, countries, continents, and the like. The number of routes 102 shown in FIG. 1 is meant to be illustrative and not limiting on embodiments of the described subject matter. Moreover, while one or more embodiments described herein relate to a transportation network formed from railroad tracks, not all embodiments are so limited. One or more embodiments may relate to transportation networks in which vehicles other than rail vehicles travel.

A vehicle 104 travels along the routes 102 in the transportation network 100. Travel of one or more vehicles 104 may be constrained to travel within the transportation network 100 (referred to herein as "intra-network travel"). Alternatively, one or more vehicles 104 may enter the transportation network 100 from another transportation network or leave the transportation network 100 to travel into another transportation network (referred to herein as "inter-network travel"). Different transportation networks may be defined based on geography and/or ownership or control by different entities. In the illustrated embodiment, the vehicle 104 is shown and described herein as a rail vehicle or a rail vehicle consist. However, one or more other embodiments may relate to vehicles other than rail vehicles or rail vehicle consists. For example, the vehicles 104 may represent other off-highway vehicles (e.g., vehicles that are not designed or allowed by law or regulation to travel on public roads, highways, and the like), automobiles, marine vessels, airplanes, and the like. While one vehicle 104 (including powered and non-powered units) is shown in FIG. 1, alternatively, a different number of vehicles 104 may be concurrently traveling in the transportation network 100.

A vehicle 104 may include a group of powered units 106 (e.g., locomotives or other vehicles capable of self-propulsion) and/or non-powered units 108 (e.g., cargo cars, passenger cars, or other vehicles incapable of self-propulsion) that are mechanically coupled or linked together to travel along the routes 102. The term "powered" refers to the capability of the units 106 to propel themselves and not to whether the units 106 or 108 receive energy (e.g., electric current) for one or more purposes. For example, the non-powered units 108 may receive electric current to power one or more loads disposed on-board the non-powered units 108. A group or series of units (vehicles) 106, 108 that are coupled with each other to travel as a unit can be referred to as a consist. Additionally or alternatively, several consists of units 106, 108 can be connected with each other to travel as a larger unit or consist. The routes 102 are interconnected to permit vehicles 104 to travel over various combinations of the routes 102 to move from a starting location to a destination location.

In the illustrated embodiment, a consist 150 is traveling in the transportation network 100. A consist may be one or more powered units that may or may not be directly connected. A vehicle system or vehicle, for example, a train, may include one or more consists. In other embodiments, additional consists may be traveling in the transportation network 100. The consist 150 includes powered units 160, 162, and 164 positioned in a first powered unit grouping (i.e., first sub-consist of powered units); powered units 170 and 172 positioned in a second powered unit grouping (i.e., second sub-consist of powered units); and powered unit 180 positioned in a third powered unit grouping (of which powered unit 180 is the only powered unit). Thus, a consist may include various groupings of powered units with non-powered units disposed therebetween. In FIG. 1, the consist 150 is depicted as travelling in a generally right to left direction. The powered unit 160 may be considered a lead powered unit of the consist 150, and the powered unit 180 may be considered a trail powered unit of the consist 150. The embodiment of FIG. 1 is provided for illustrative purposes only, as other arrangements, orientations, and/or numbers of powered units and/or non-powered cars may be used in other embodiments. In embodiments, the lead powered unit (e.g., powered unit 160 in the illustrated embodiment) may control the operations of other, remote powered units. In other embodiments, a powered unit other than the lead powered unit may act to control the operations of one or more other powered units.

The vehicle 104 may travel along the routes 102 according to a movement plan of the transportation network 100. The movement plan coordinates movement of different vehicles in the transportation network 100. For example, the movement plan may include schedules for the vehicles to move from a starting location or a current location to a destination location at a scheduled arrival time. Each schedule may dictate a destination location and the scheduled arrival time for a vehicle 104. Alternatively, the schedule may include one or more intermediate events for the vehicle 104 prior to reaching the destination location at the scheduled arrival time, such as a location and/or time for the vehicle 104 to stop and refuel.

The movement plan may be determined by a scheduling system 110. As shown in FIG. 1, the scheduling system 110 can be disposed off-board (e.g., outside) of the vehicles 104. For example, the scheduling system 110 may be disposed at a central dispatch office for a railroad company. The scheduling system 110 can create and communicate the schedules to the vehicles 104. The scheduling system 110 can include a wireless antenna 112 (and associated transceiving equipment), such as a radio frequency (RF) or cellular antenna, that wirelessly transmits the schedules to the vehicles 104. For example, the scheduling system 110 may transmit destination locations and associated arrival times to the vehicles 104. The scheduling system 110 may also receive information from the vehicle 104 to analyze or pass along to a central data store or analysis center. For example, the vehicle 104 (e.g., a lead unit of the vehicle 104) may send information to the scheduling system regarding fuel consumption so that a central planning unit or analysis unit has access to the fuel consumption information and can evaluate fuel efficiency technologies being employed for all or part of a mission by the vehicle 104.

The vehicles 104 include control systems 114 disposed on-board the vehicles 104. The control systems 114 receive the schedules from the scheduling system 110 and generate control signals that may be used to control propulsion of the vehicle 104 through the transportation network 100. For example, the vehicle 104 may include wireless antennas 116 (and associated transceiving equipment), such as RF or cellular antennas, that receive the schedules from the scheduling system 110. The wireless antenna 116 communicates the received schedule to the control system 114 that may be disposed on-board the vehicle 104. The control system 114 examines the schedule, such as by determining the scheduled destination location and scheduled arrival time, and generates control signals based on the schedule.

The control signals may be used to automatically control tractive efforts and/or braking efforts of the vehicle 104 such that the vehicle 104 self-propels along the routes 102 to the destination location. For example, the control system 114 may be operatively coupled with a propulsion subsystem 118 of the vehicle 104. The propulsion subsystem 118 may include motors (such as traction motors), engines, brakes (such as air brakes and/or regenerative brakes), and the like, that generate tractive energy to propel the vehicle 104 and/or slow movement of the vehicle 104. The control system 114 may generate control signals that automatically control the propulsion subsystem 118, such as by automatically changing throttle settings and/or brake settings of the propulsion subsystem 118. (Self-propulsion includes automatic operation under the purview of an operator, who may have the option to take over manual control of the vehicle.)

In another embodiment, the control signals may be used to prompt an operator of the vehicle 104 to manually control the tractive efforts and/or braking efforts of the vehicle 104. For example, the control system 114 may include an output device, such as a computer monitor, touchscreen, acoustic speaker, or the like, that generates visual and/or audible instructions based on the control signals. The instructions may direct the operator to manually change throttle settings and/or brake settings of the propulsion subsystem 118.

The control system 114 may form or obtain a trip plan for a trip of the vehicle 104 to travel to a scheduled destination location at a scheduled arrival time. The trip plan may include throttle settings, brake settings, designated speeds, or the like, of the vehicle 104 for various sections of the trip of the vehicle 104. For example, the trip plan can include one or more velocity curves that designate various speeds of the vehicle 104 along various sections of the routes 102. The trip plan can be formed based on a trip profile associated with an upcoming trip of a vehicle 104. The trip profile can include information related to the vehicle 104, the routes 102 over which the vehicle 104 will traverse during the upcoming trip, and/or other information. The information related to the vehicle 104 can include the type of vehicle 104, the tractive energy generated by powered units 106 in the vehicle 104, the weight or mass of the vehicle 104 and/or cargo being carried by the vehicle 104, the length and/or other size of the vehicle 104 (e.g., how many powered and non-powered units 106, 108 are mechanically coupled with each other in the vehicle 104), and the like. The information related to the route 102 can include the curvature, grade (e.g., inclination), existence of ongoing repairs, speed limits, and the like, for one or more sections of the route 102. The other information can include information related to conditions that impact how much fuel the vehicles 104 consume while traveling, such as the air pressure, temperature, humidity, and the like. The control system 114 may form the control signals based on the trip plan.

The transportation network 100 also includes a fuel consumption analysis module 120. The fuel consumption analysis module 120 in the illustrated embodiment is disposed on-board the vehicle 104 (e.g., disposed on-board the consist 150 at the lead locomotive 160), and is configured to determine fuel consumed by the vehicle 104 during a mission. For example, the fuel consumption analysis module 120 may calculate fuel consumption autonomously between one or more points during the mission. Such fuel consumption information may be used during the trip to confirm and/or modify a trip plan to account for premature depletion of fuel, and/or after a trip, for example, to determine an effectiveness of a fuel savings technology. In the illustrated embodiment, the fuel consumption analysis module 120 is disposed on-board the lead powered unit 160. In other embodiments, for example, the fuel consumption analysis module 120 may be disposed on a remote powered unit, or as another example, on a non-powered unit.

For example, the fuel consumption analysis module 120 may begin determining fuel consumption at point A depicted in FIG. 1, and continue determining fuel consumption up until point B. The total fuel consumed thus would represent the fuel consumed between points A and B. By determining, for example, the actual fuel consumed on a trip between points A and B by the vehicle 104 utilizing a technology or technologies of interest, and then comparing the actual fuel consumed with the expected fuel consumption of an identical or similar vehicle without the technology or technologies of interest, the amount of fuel saved by utilizing the technology or technologies of interest may be determined. Alternatively or additionally, the relative effectiveness of a plurality of fuel saving technologies or initiatives may be understood by comparing the fuel consumed by, for example, missions performed by each particular technology compared with other technologies. Further, the effectiveness of new technologies or initiatives may be understood by comparing a similar mission or missions performed by different technologies or initiatives and thus determining which were more effective.

For example, the fuel consumption analysis module 120 may collect, receive, or otherwise obtain information regarding the actual operation of each individual locomotive in a vehicle system. The information for example, may include information regarding the status (e.g., whether the locomotive is providing power or is shut down) or power level (e.g., throttle settings for each locomotive during a trip or mission). Using this information, the fuel consumption analysis module may determine the fuel consumed by each individual locomotive as well as the sum of all locomotives in the vehicle system, or, as another example, fuel consumed by one or more of the powered unit consists within the consist 150 (e.g., the first grouping including powered units 160, 162, 164; the second grouping included powered units 170, 172; or the third grouping including powered unit 180).

For example, the fuel consumption analysis module 120 may obtain, for each locomotive, information describing the amount of time the locomotive spends at a given throttle setting, for example a notch. For each individual locomotive, the rate of fuel consumption used at a given throttle setting is known and stored in a table, for example a database included with, associated with, or otherwise accessible by the fuel consumption analysis module 120. By multiplying the time a given locomotive spends in a given notch by the fuel consumption rate of the given locomotive at the particular notch, and summing such fuel consumption as the trip progresses, the amount of fuel consumed by a given locomotive over a given route or portion of a route may be determined. Similar computations may be performed for the other locomotives in a vehicle system, and the fuel consumption may be summed for all of the locomotives or a group of locomotives.

The fuel consumption analysis module 120 thus has access to, either via the trip profile information, the table including fuel consumption properties, and/or additional sources, information describing the characteristics or makeup of the vehicle system as a whole, as well as individual characteristics of each locomotive within the vehicle system. For example, such information may include an identification number of each locomotive that corresponds to tabulated information regarding the fuel consumption rate of each locomotive at each throttle setting, the position of each locomotive within the vehicle system, information identifying if the particular locomotive is the lead locomotive or a remote locomotive for the particular trip or mission, and information regarding the amount of fuel that each particular began a particular trip or mission with.

For example, if the powered unit 164 for any reason becomes inoperative and shuts down, the fuel consumption analysis module 120 may receive information regarding the shut-down, and use the information accordingly to determine fuel consumption, for example, by not collecting any further data from the powered unit 164 as long the powered unit 164 is shut down. Due to the shut-down of the powered unit 164, other powered units, for example powered units 160 and 162 may then operate at higher throttle setting than originally planned to adhere to an original schedule. Because the powered units 160 and 162 are operating at higher throttle settings, the powered units 160 and 162 would therefore also be consuming additional fuel than originally planned. In the illustrated embodiment, the fuel consumption analysis module 120 receives the operating information and determines the fuel consumption during a trip or mission (for example, in some embodiments in real time, or, as another example, in other embodiments, at periodic intervals). The fuel consumption analysis module 120 may then determine a fuel level for the powered units 160 and 162 (or other units in the vehicle system) by subtracting the determined actual fuel consumed from the beginning fuel level.

The fuel consumption analysis module 120 may then facilitate a corrective action based on an amount of fuel remaining. For example, if the fuel remaining for one or more powered units drops below a threshold, the fuel consumption analysis module 120 may issue an alarm to an operator of the vehicle 104 or to a scheduling or monitoring system associated with the vehicle 104, alerting of a low fuel condition. Alternatively or additionally, the fuel consumption analysis module 120 may provide information regarding the low fuel condition (e.g., identifying a powered unit and the location of a powered unit within a vehicle system along with the fuel remaining for the powered unit) to a trip planning module (for example, a trip planning module that is part of the control system 114, or, as another example, a trip planning module that is separate from the control system 114). The trip planning module may then adjust a trip plan as appropriate.

For example, a fuel stop previously not in the trip plan may be added to help reduce the risk of the vehicle running out of fuel at a distance from available fuel stops. As another example, the trip plan may be modified to require less power from one or more powered units running low on fuel as identified by the fuel consumption analysis module 120, for example by shifting tractive effort from an identified powered unit to one or more powered units that have sufficient fuel, or, as another example, by reducing tractive effort during all or a portion of a trip to preserve fuel in the identified powered unit.

The transportation network 100 further includes an operating information module 122 and operating information communication link 124. The operating information module 122 is configured to collect operating information. For example, in the illustrated embodiment, each powered unit includes an operating information module 122 disposed thereon. The operating information module 122 may be, for example, a device mounted to a powered unit and operably connected with the dynamic braking system of the powered unit, with the device autonomously detecting and collecting tractive and/or braking efforts made by the powered unit during a trip or performance of a mission. In the illustrated embodiment, each operating information module 122 collects operating information for the particular powered unit on which the particular operating information module 122 is disposed. Such operating information may include, for example, the actual throttle settings used by the powered unit during a trip as well as the time durations or periods that each throttle setting is employed. These throttle settings may be automatically controlled based on a trip plan and/or controlled by an operator.

In other embodiments, for example, an operating information module may collect information for more than one powered unit, for example all locomotives of a predetermined grouping, or, as another example, all locomotives in an entire vehicle system. Further, in certain embodiments, the operating information module 122 and/or the operating information communication link 124 may be dedicated to the fuel consumption analysis module 120 and provide information directly to only the fuel consumption analysis module 120, while in other embodiments, the operating information module 122 and/or the operating information communication link 124 may be shared with other aspects of a vehicle system. For example, the operating information module 122 and the operating information communication link 124 may be associated with a dynamic braking system and include a dynamic brake modem that also provides information to a control system and/or event recorder.

In the illustrated embodiment, each powered unit includes an operating information communication link 124 disposed thereon and associated with the operating information module 122 that is disposed on the particular powered unit. The operating information communication link 124 is configured to communicatively join the associated operating information module 122 with the fuel consumption analysis module 120. For example, the operating information communication link 124 may include a modem that receives information from the operating information module 122 and forwards the received information to the fuel consumption analysis module 120. Thus, the operating information module 122 may autonomously transmit operating information to the fuel consumption analysis module 120 via the operating information communication link 124.

In embodiments, the operating information link 124 may include a hardwired connection communicatively coupling the operating information communication link 124 with the fuel consumption analysis module 120. In embodiments, the operating information communication link 124 may include a wireless connection. In the illustrated embodiment, the operating information communication link 124 is depicted as distinct from the operating information module 122. In other embodiments, for example, the operating information communication link 124 may be part of an integral unit also including the operating information module 122.

The transportation network 100 also includes a location information module 132 and location information communication link 134. The location information module 132 is configured to collect information regarding the geographical location of an associated unit or units. For example, in the illustrated embodiment, each powered unit includes location information module 132 disposed thereon. Each location information module 132 collects location information for the particular powered unit on which the particular location information module 132 is disposed. Such location information may include a location as identified by a Global Positioning System (GPS) receiver, and may, in embodiments, also include information regarding a time at which the particular position was recorded.

In other embodiments, for example, a location information module may collect information for more than one powered unit, for example all locomotives of a predetermined grouping, or, as another example, all locomotives in an entire vehicle system. For example, a location associated with the lead powered unit may be used as a proxy for the location of all units. Further, in certain embodiments, the location information module 132 and/or the location information communication link 134 may be dedicated to the fuel consumption analysis module 120 and provide information directly to only the fuel consumption analysis module 120, while in other embodiments, the location information module 132 and/or the location information communication link 134 may be shared with other aspects of a vehicle system. For example, the location information module 132 and the operating information communication link 134 may include a GPS receiver and a GPS modem that also provide information to a control system and/or event recorder.

In the illustrated embodiment, each powered unit includes a location information communication link 134 disposed thereon and associated with the location information module 132 that is disposed on the particular powered unit. The location information communication link 134 is configured to communicatively join the associated location information module 132 with the fuel consumption analysis module 120. For example, the location information communication link 134 may include a modem that receives information from the location information module 132 and forwards the received information to the fuel consumption analysis module 120. The information regarding location may be forwarded continuously to the fuel consumption analysis module 120, or, in other embodiments, forwarded on a periodic basis. Further, the information may also include temporal information identifying a time at which any given location was determined. Further still, in embodiments, the information includes identification of two or more locations that indicate a start or stop point for fuel consumption determination. For example, fuel consumption may be desired to be computed between points A and B of a trip or mission. Point A corresponds to a start point and point B corresponds to a stop point. The fuel consumption analysis module 120 may be configured to start determining fuel consumption and/or saving fuel consumption related data for any particular powered unit when the particular powered unit is identified by the location information as being at point A by the location information, and to stop determining and/or saving when the particular powered unit is identified as being at point B.

In embodiments, the location information link 134 may include a hardwired connection communicatively coupling the location information communication link 134 with the fuel consumption analysis module 120. In embodiments, the location information communication link 134 may include a wireless connection. In the illustrated embodiment, the location information communication link 134 is depicted as distinct from the location information module 132. In other embodiments, for example, the location information communication link 134 may be part of an integral unit also including the location information module 132. Further, in alternate embodiments, the location information link 134 may be part of an integral unit with the operating information communication link 124, and/or the location information module 132 may be part of an integral unit with the operating information module 122.

Figure 2:
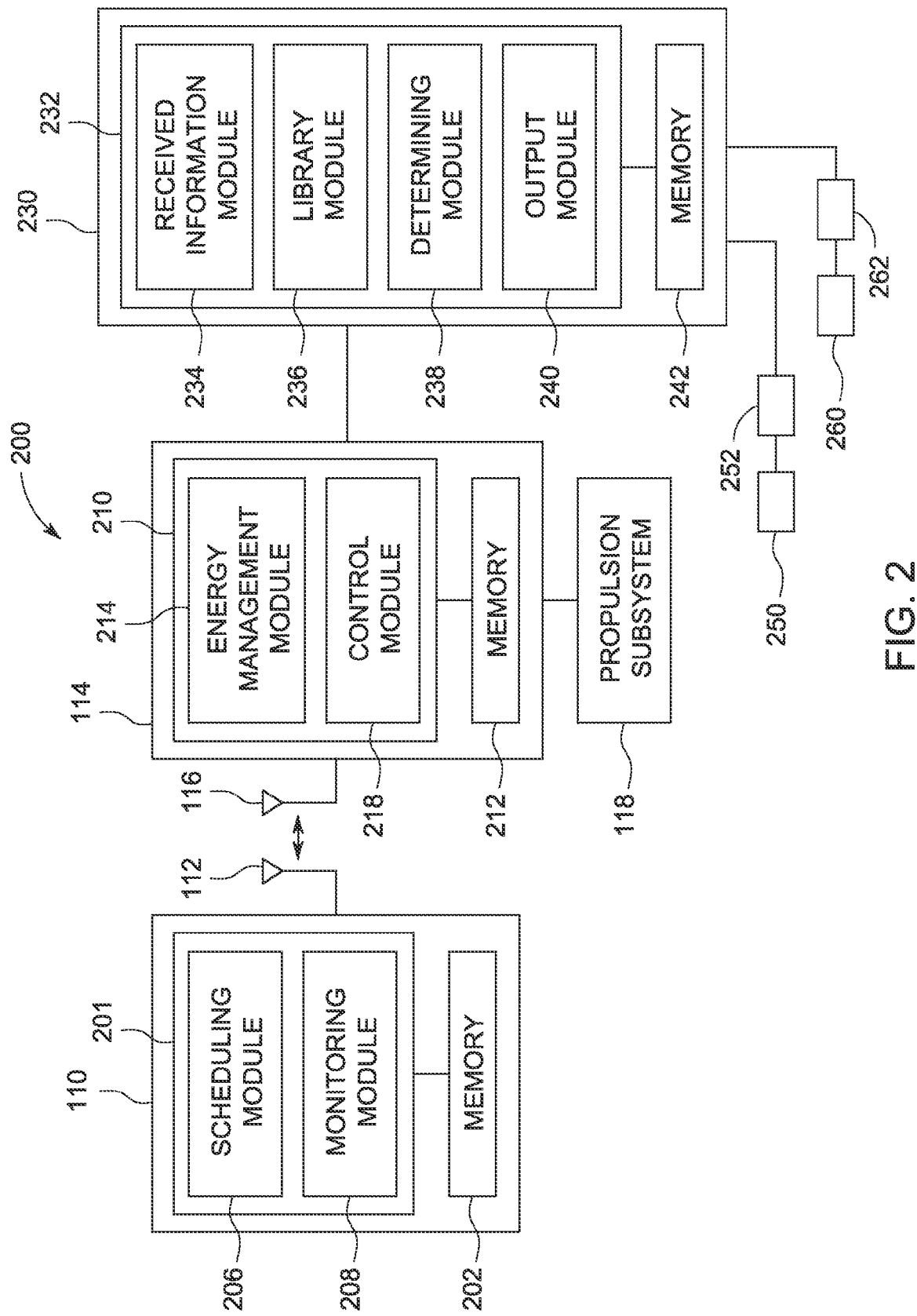
FIG. 2 is a schematic diagram of one embodiment of a system including a fuel consumption analysis system shown in FIG. 1.

FIG. 2 is a schematic diagram of one embodiment of a system 200 including the scheduling system 110 and the control system 114. While the scheduling system 110 is shown in FIG. 2 as communicating with a single control system 114, in one embodiment, the scheduling system 110 can concurrently communicate with two or more control systems 114 disposed on-board two or more different (e.g., not mechanically coupled with each other) vehicles 104 (shown in FIG. 1).

The scheduling system 110 includes a controller 201, such as a computer processor or other logic-based device that performs operations based on one or more sets of instructions (e.g., software). The instructions on which the controller 201 operates may be stored on a tangible and non-transitory (e.g., not a transient signal) computer readable storage medium, such as a memory 202. The memory 202 may include one or more computer hard drives, flash drives, RAM, ROM, EEPROM, and the like. Alternatively, one or more of the sets of instructions that direct operations of the controller 201 may be hard-wired into the logic of the controller 201, such as by being hard-wired logic formed in the hardware of the controller 201.

The scheduling system 110 includes several modules that perform various operations described herein. The modules are shown as being included in the controller 201. As described above, the modules may include hardware and/or software systems that operate to perform one or more functions, such as the controller 201 and one or more sets of instructions. Alternatively, one or more of the modules may include a controller that is separate from the controller 201.

The scheduling system 110 includes a scheduling module 206 that creates schedules for the vehicles 104 (shown in FIG. 1). In one embodiment, the scheduling module 206 controls communication between the scheduling system 110 and the vehicles 104. For example, the scheduling module 206 may be operatively coupled with the antenna 112 to permit the scheduling module 206 to control transmission of data (e.g., schedules) to the vehicles 104 and to receive data (e.g., trip plans, amounts of fuel carried by the vehicles 104, or the like) from the vehicles 104. Alternatively, another module or the controller 201 may be operatively coupled with the antenna 112 to control communication with the vehicles 104. Further still, the scheduling system 110 may also receive information from the vehicles 104 regarding fuel consumed by the vehicles 104. Such information may be received either during or after a trip or mission performed by a vehicle 104. The information may be used, for example, to evaluate the effectiveness of one or more new technologies or initiatives designed to conserve fuel. The fuel consumption information may be evaluated by the scheduling system 110, and/or may be passed along to another recipient for evaluation.

The scheduling module 206 creates schedules for the vehicles 104 (shown in FIG. 1). The scheduling module 206 can form the movement plan for the transportation network 100 (shown in FIG. 1) that coordinates the schedules of the various vehicles 104 traveling in the transportation network 100. For example, the scheduling module 206 may generate schedules for the vehicles 104 that are based on each other so that a throughput parameter of the transportation network 100 remains above a threshold.

The scheduling system 110 includes a monitoring module 208 in the illustrated embodiment. The monitoring module 208 can monitor travel of the vehicles 104 (shown in FIG. 1) in the transportation network 100 (shown in FIG. 1). The vehicles 104 may periodically report current positions of the vehicles 104 to the scheduling system 110 so that the monitoring module 208 can track where the vehicles 104 are located. Alternatively, signals or other sensors disposed alongside the routes 102 (shown in FIG. 1) of the transportation network 100 can periodically report the passing of vehicles 104 by the signals or sensors to the scheduling system 110. The monitoring module 208 receives the locations of the vehicles 104 in order to monitor where the vehicles 104 are in the transportation network 100 over time. The monitoring module 208 may also track, tabulate, compare and/or analyze fuel consumption information provided by vehicle system. For example, in embodiments, a vehicle system (e.g., a lead powered unit of the vehicle system) may autonomously transmit fuel consumption information describing fuel consumed by all or a portion of a vehicle system to the monitoring module 208 for further analysis and/or forwarding to another recipient for analysis. In embodiments, fuel consumption information may be provided on an on-demand basis via antennas 112 and 116 or other wireless communication, for example responsive to a request from the scheduling system 110 or other recipient for fuel consumption information for all or a portion of a vehicle system.

The scheduling module 206 creates schedules for the vehicles 104 (shown in FIG. 1) and transmits the schedules to the control systems 114 of the vehicles 104. In one embodiment, the scheduling module 206 may modify a previously created schedule that previously was sent to a vehicle 104. The scheduling module 206 may convey the schedules to the antenna 112, which transmits the schedules to the antennas 116 of the control systems 114 of the corresponding vehicles 104.

The control systems 114 of the vehicles 104 (shown in FIG. 1) receive the schedules sent by the scheduling system 110. In the illustrated embodiment, the control system 114 of a vehicle 104 includes a controller 210, such as a computer processor or other logic-based device that performs operations based on one or more sets of instructions (e.g., software). The instructions on which the controller 210 operates may be stored on a tangible and non-transitory (e.g., not a transient signal) computer readable storage medium, such as a memory 212. The memory 212 may include one or more computer hard drives, flash drives, RAM, ROM, EEPROM, and the like. Alternatively, one or more of the sets of instructions that direct operations of the controller 210 may be hard-wired into the logic of the controller 210, such as by being hard-wired logic formed in the hardware of the controller 210.

The control system 114 includes several modules that perform various operations described herein. The modules are shown as being included in the controller 210. As described above, the modules may include hardware and/or software systems that operate to perform one or more functions, such as the controller 210 and one or more sets of instructions. Alternatively, one or more of the modules may include a controller that is separate from the controller 210, or may be combined to form a combined module.

The control system 114 receives the schedules from the scheduling system 110. The controller 210 may be operatively coupled with the antenna 116 to receive the initial and/or modified schedules from the scheduling system 110. In one embodiment, the schedules are conveyed to an energy management module 214 of the control system 114. In another embodiment, the energy management module 214 may be disposed off-board the vehicle 104 (shown in FIG. 1) for which the trip plan is formed. For example, the energy management module 214 can be disposed in a central dispatch or other office that generates the trip plans for one or more vehicles 104. As another example, the energy management module 214 may be associated with a separate controller also disposed on-board the vehicle 104.

The energy management module 214 receives the schedule sent from the scheduling system 110 and generates a trip plan based on the schedule. As described above, the trip plan may include throttle settings, brake settings, designated speeds, or the like, of the vehicle 104 (shown in FIG. 1) for various sections of a scheduled trip of the vehicle 104 to the scheduled destination location. The trip plan may be generated to reduce the amount of fuel that is consumed by the vehicle 104 as the vehicle 104 travels to the destination location relative to travel by the vehicle 104 to the destination location when not abiding by the trip plan.

In order to generate the trip plan for the vehicle 104 (shown in FIG. 1), the energy management module 214 can refer to a trip profile that includes information related to the vehicle 104, information related to the route 102 (shown in FIG. 1) over which the vehicle 104 travels to arrive at the scheduled destination, and/or other information related to travel of the vehicle 104 to the scheduled destination location at the scheduled arrival time. The information related to the vehicle 104 may include information regarding the fuel efficiency of the vehicle 104 (e.g., how much fuel is consumed by the vehicle 104 to traverse different sections of a route 102), the tractive power (e.g., horsepower) of the vehicle 104, the weight or mass of the vehicle 104 and/or cargo, the length and/or other size of the vehicle 104, the location of the powered units 106 (shown in FIG. 1) in the vehicle 104 (e.g., front, middle, back, or the like of a vehicle system having several mechanically interconnected units 106, 108), or other information. The information related to the route 102 to be traversed by the vehicle 104 can include the shape (e.g., curvature), incline, decline, and the like, of various sections of the route 102, the existence and/or location of known slow orders or damaged sections of the route 102, and the like. Other information can include information that impacts the fuel efficiency of the vehicle 104, such as atmospheric pressure, temperature, and the like. The trip profile may also include, for example, information regarding the quantity of fuel on-board the vehicle at the beginning of a trip or mission and/or the quantity of fuel on-board the vehicle after any intermediate fuel stops made during the trip or mission.

The trip plan is formulated by the energy management module 214 based on the trip profile. For example, if the trip profile requires the vehicle 104 (shown in FIG. 1) to traverse a steep incline and the trip profile indicates that the vehicle 104 is carrying significantly heavy cargo, then the energy management module 214 may form a trip plan that includes or dictates increased tractive efforts to be provided by the propulsion subsystem 118 of the vehicle 104. Conversely, if the vehicle 104 is carrying a smaller cargo load and/or is to travel down a decline in the route 102 (shown in FIG. 1) based on the trip profile, then the energy management module 214 may form a trip plan that includes or dictates decreased tractive efforts by the propulsion subsystem 118 for that segment of the trip. In one embodiment, the energy management module 214 includes a software application or system such as the Trip Optimizer™ system provided by General Electric Company.

The fuel consumption analysis module 230 is configured to determine fuel consumed the vehicle (e.g., fuel consumed by one or more powered units of the vehicle). In the illustrated embodiment, the fuel consumption analysis module 230 includes a controller 232, such as a computer processor or other logic-based device that performs operations based on one or more sets of instructions (e.g., software). The instructions on which the controller 232 operates may be stored on a tangible and non-transitory (e.g., not a transient signal) computer readable storage medium, such as a memory 242. The memory 242 may include one or more computer hard drives, flash drives, RAM, ROM, EEPROM, and the like. Alternatively, one or more of the sets of instructions that direct operations of the controller 232 may be hard-wired into the logic of the controller 232, such as by being hard-wired logic formed in the hardware of the controller 232.

The fuel consumption analysis module 230 includes several modules that perform various operations described herein. The modules are shown as being included in the controller 232. As described above, the modules may include hardware and/or software systems that operate to perform one or more functions, such as the controller 230 and one or more sets of instructions. Alternatively, one or more of the modules may include a controller that is separate from the controller 232, or may be combined to form a combined module.

The fuel consumption analysis module 230 includes a received information module 234, a library module 236, a determining module 238, an output module 240, and a memory 242. The received information module 234 is configured to collect information regarding actual operation of a vehicle system. For example, the received information module 234 may access information from a plurality of remote devices disposed on-board a corresponding plurality of powered units, such as locomotives. In embodiments, each locomotive has disposed thereon an operating information collection unit that collects information regarding tractive effort, for example horsepower, or as another example, throttle setting, and forwards the information, for example autonomously, to the received information module 234 of the fuel consumption analysis module 230. The library module 236 is configured to store information regarding the vehicle system for retrieval by the determining module 238. The determining module 238 is configured to use information collected by the received information module 234 to determine the fuel actually being consumed by the vehicle system during performance of a mission. The output module 240 is configured to provide the determined fuel consumption to a recipient, for example, for analysis of fuel consumption, or as another example, to make any appropriate changes to a trip plan.

The received information module 234 receives information from one or more sources regarding the operation of a vehicle system as the vehicle system performs a mission. For example, the received information module 234 may receive information regarding tractive effort, such as horsepower and/or throttle settings. For example, the received information module 234 may receive information from one or more powered vehicles describing the throttle settings for the one or more powered vehicles, along with information describing the time spent at each throttle setting. Further, information sent regarding tractive effort for a given powered vehicle may also include an identification number or code identifying the particular powered vehicle for which the tractive effort information was collected. As another example, the received information module 234 may receive information describing the position or location of one or more powered units of the vehicle system, such as information from a GPS receiver. The received information module 234 may include, for example, a hardwired connection to one or more powered units, or as another example, an antenna for receiving wireless communications.

The library module 236 acts as a repository of information regarding the vehicle system. For example, the library module 236 may receive or access information regarding the makeup of a vehicle system for a particular mission or portion of mission. Such information may include an identification of each powered vehicle of the vehicle system along with the position of the vehicle in the system. Such information may also include specific characteristics of particular vehicles. For example, the library module 236 may include a table identifying the rate of fuel consumption for each individual powered vehicle in the system. The library module 236 may also receive information from the trip profile of the energy management module 214.

In the illustrated embodiment, the determining module 238 uses information from the received information module 234 and information from the library module 236 (and/or information from the trip profile of the energy management module 214) to determine fuel consumption. For example, the determining module 238 may access information regarding throttle settings from a particular powered unit. Using the identification information associated with the throttle settings, the determining module may then access information from the library module 236 describing the fuel consumption rates at various throttle settings for the particular powered unit (e.g., a table listing fuel consumption rates at each throttle setting). Thus, by knowing the time spent at each throttle setting as well as the fuel consumption rate at each throttle setting, the determining module 238 may determine the fuel consumed by a particular powered unit using the operating information and corresponding fuel consumption rates to determine the fuel consumed by that particular powered unit. By a similar analysis of all powered units in a given consist or vehicle system, and summing the totals of the individual powered units, the fuel consumption for the entire given consist or vehicle system may be obtained.

In embodiments, such analysis of one or more powered units is performed on an ongoing substantially continuous basis so that fuel consumption totals are determined generally in real time or known substantially instantaneously. Alternatively or additionally, fuel consumption may be totaled at periodic intervals, for example, every minute, or as another example, every five minutes. Further, fuel consumption may be totaled at periodic intervals corresponding to a distance traveled. As one example, fuel consumption may be totaled every ten miles of travel. As another example, fuel consumption may be totaled as a vehicle system passes predetermined points along a mission, for example, at each stop, or as another example, as a vehicle system passes a predetermined point of interest identified, for example, by a GPS location.

In embodiments, the determining module 238 is configured to confirm the quality of information being obtained on-board, for example, relating to the operating information. For example, the determining module 238 may receive or access the identification information for each powered unit for which information is received regarding tractive effort. The determining module 238 may then compare the received identification information with information in the library module 236 listing all powered unit in the vehicle system. If any powered units are identified by the library module 236 are not providing information regarding throttle setting, the determining module 238 may perform further analysis to confirm the quality of data.

For example, if it is determined that the powered unit is not providing information due to a planned or otherwise known shut-down, then the information received may be considered complete. However, if it is determined that a powered unit is not providing information due to a communications problem, then the determining module 238 may identify a given total as incomplete. In the case of incomplete data, or, as another example, data that is incomplete over a given interval threshold, the determining module 238 may flag the total as incomplete. Thus, when later analysis of the information is done, for example, to evaluate a given fuel savings technology or initiative, the information set can be identified as incomplete and discarded for all or a portion of a vehicle system being studied, so that a bad data set does not influence the evaluation.

Fuel consumption may be determined on an individual basis for each powered unit as well as for the total of all powered units of a consist or vehicle system. For example, fuel consumption determined for each individual powered unit may provide an indication if any individual powered unit is running low on fuel. Fuel consumption may be determined for an entire trip or mission and/or for one or more portions of the trip or mission. Further, fuel consumption may be determined on-board autonomously during performance of a mission, as well as retrospectively after performance of a mission. For example, the determining module 238 may autonomously determine fuel consumption for an entire mission once the vehicle system reaches its final destination, or at a predetermined point proximate to the final destination. Further, information recorded by the fuel consumption analysis module 230 may be retrospectively queried to identify fuel consumption between particular points of interest. In other embodiments, the fuel consumption for different segments may be autonomously determined during a mission as the vehicle system passes the end points of the corresponding different segments.

For example, with reference to FIG. 1, a vehicle 104 during a trip or mission may travel from a beginning point substantially located at point A to an end point substantially located at point B. To determine the fuel consumption for the entire trip, a fuel consumption analysis module may collect information regarding the operation of all powered units of the vehicle 104 between points A and B. For example, the passage of one or more powered units by point A may be used as a signal to start collecting the operating information of the powered units, and passage by point B may serve as a signal to stop collecting operating information, and to compute the fuel consumed using the operating information. In other embodiments, a running total of fuel consumed may be kept along the route, and passage past point B may serve as a signal to stop computing and/or to transmit the information regarding fuel consumed to an analysis center.

Additionally or alternatively, the fuel consumed for one or more segments or portions of the trip from A-B may be computed as well. For example, the fuel consumption analysis module may autonomously determine fuel consumed for segments defined by the portions of the route defined by end points A-C, A-D, C-D, and/or C-B. For example, a fuel efficiency technology being evaluated on a trip from A to B may have particular applicability or relevance to travel over hilly or mountainous terrain. One or more segments along the route from A to B may be selected for fuel consumption study. For example, if the route portion defined by endpoints A-C is relatively flat, but the route portion C-D experiences significant grades and/or changes in grades, then the fuel consumed may be determined for the portion of the route C-D in addition to the fuel consumed for the entire trip A-B. The fuel consumed along C-D may then be used, for example in combination and/or comparison with other trips or trip portions along C-D, to determine the performance and/or benefit of the fuel efficiency technology being evaluated. The fuel consumed for the entire trip from A-B may also be used to determine the performance and/or benefit of the fuel efficiency technology being evaluated. In still other embodiments, different fuel efficiency technologies or efficiencies may be used along different portions of a route, for example substantially similar portions of a route, with the fuel consumed for the different portions compared to evaluate the relative performances of the corresponding fuel efficiency technologies.

Further still, in embodiments, fuel consumption analysis for one or more portions or segments of a trip or mission may be performed retrospectively. For example, the operating information and location information for the trip or mission may be autonomously collected and saved on-board the vehicle. Then, at a later date, the saved information (for example, tabulated by position, throttle setting, and individual powered unit identification and/or characteristics) may be queried or sorted between location points defining a segment to be studied.

Returning to FIG. 2, the output module 240 of the fuel consumption analysis module 230 is configured to provide information or otherwise allow access to information regarding the fuel consumption determined by the determining module 236. The information may relate to an individual powered unit or a group of powered units, such as all powered units in a vehicle system. The information regarding fuel consumption may be provided to, for example, the scheduling system or to a recipient for further analysis. For example, at or near the end of a particular mission (or portion of a mission) the fuel consumption analysis module 230 may autonomously determine a total fuel consumption for the mission (or portion of the mission) and forward the information, for example, via a wireless transmission. The information may then be collected and used to keep a running total of all fuel consumed, for example, by a railroad system over a given period of time. Additionally or alternatively, the fuel consumption information may be used to evaluate any fuel savings technologies or initiatives utilized for that particular mission (or portion of the mission).

In embodiments, the information regarding fuel consumption may be provided to another aspect of a vehicle system to which the fuel consumption information pertains. For example, if the determining module 238 identifies a particular powered unit for which fuel is running low, the determining module 238, (e.g., in cooperation or conjunction with the output module 240) may provide an alert or alarm to another aspect of the vehicle system. As one example, an alarm may be provided to alert an operator or dispatcher associated with the vehicle system of any powered units running low on fuel. As another example, information regarding low fuel in one or more powered units may be provided to the energy management module 214, which may then modify the trip plan accordingly, for example by scheduling an additional fuel stop, or as another example, by shifting tractive effort from a powered unit running low on fuel to another powered unit that is not running low on fuel, or as yet another example, by reducing a speed along all or a portion of a mission to conserve fuel until a fuel stop is reached.

The operating information module 250 and operating information communication link 252 are configured to collect operating information and transmit all or a portion of the collected information to the fuel consumption analysis module 230. For example, the operating information module 250 may collect information regarding the throttle settings employed by a powered unit and the amount of time spent at each throttle setting. The operating information may then be provided to the operating information communication link 252, from which the operating information, along with information identifying the particular powered unit corresponding to the operating information, is transmitted to the fuel consumption analysis module 230. The operating information communication link 252 may include, for example, a hardwired connection to one or more powered units, or as another example, an antenna for receiving wireless communications. Because information from a plurality of powered units may be sent (e.g., via a hardwired connection) substantially concurrently or simultaneously, and also because all information is collected and transmitted internally within the vehicle system, errors caused by attempted retrospective correlation may be eliminated or reduced, along with errors caused by communication difficulties between one or more powered unit and a remotely located recipient.

The location information module 260 and location information communication link 262 are configured to collect operating information and transmit all or a portion of the collected information to the fuel consumption analysis module 230. For example, the location information module 260 may collect information regarding the geographical position of a powered unit, for example as identified by GPS. The location information may then be provided to the location information communication link 262, from which the location information, along with information identifying the particular powered unit corresponding to the location information, is transmitted to the fuel consumption analysis module 230. The location information communication link 262 may include, for example, a hardwired connection to one or more powered units, or as another example, an antenna for receiving wireless communications.

Because information from a plurality of powered units may be sent substantially concurrently or simultaneously, and also because all information is collected and transmitted internally within the vehicle system, errors caused by attempted retrospective correlation may be eliminated or reduced, along with errors caused by communication difficulties between one or more powered units and a remotely located recipient. For example, the fuel consumption analysis module 230 may use information from the location information module to define starting and stopping points for the collection of information from the powered units of a vehicle system. Thus, in embodiments, the information received is defined by the starting and stopping points without requiring any attempted correlation to information collected outside of the vehicle system, such as information from trackside stations or devices, thereby reducing or eliminating any errors dues to inconsistency or improper correlation with devices outside of the vehicle system.

Figure 3:
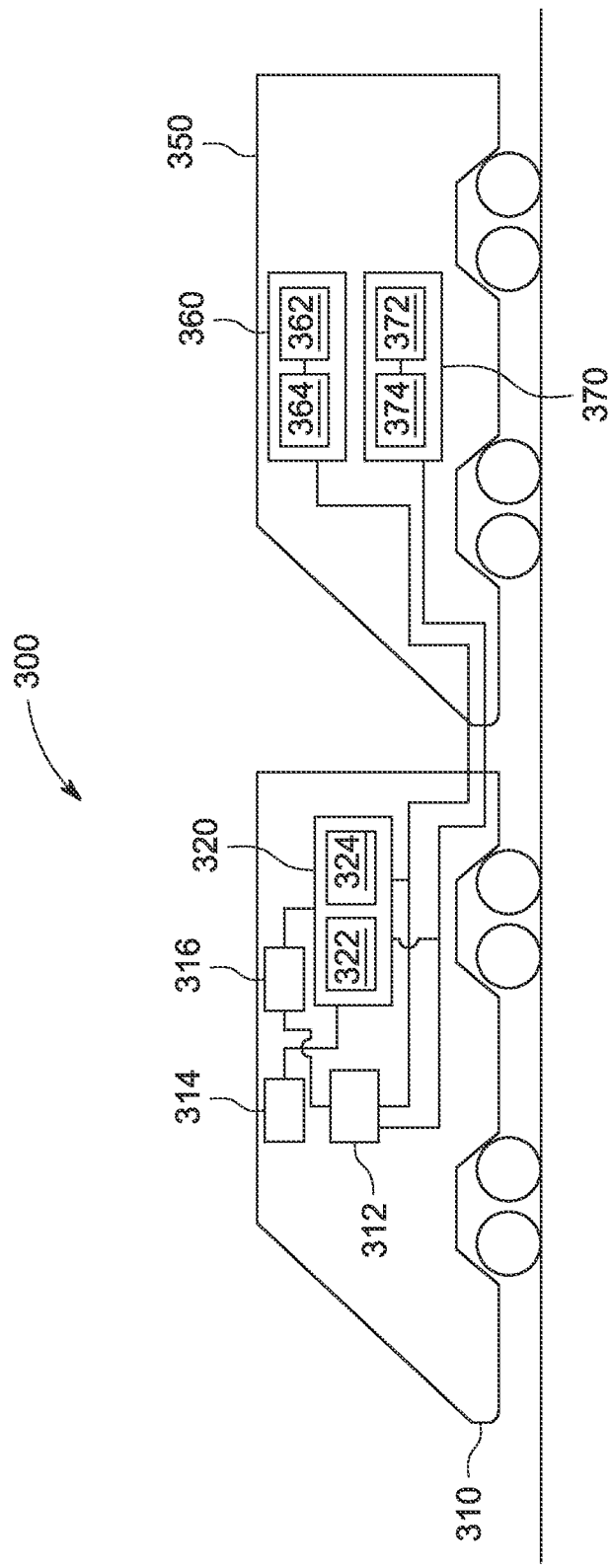
FIG. 3 is a schematic diagram of a rail vehicle system with an on-board fuel consumption analysis module in accordance with one embodiment.

FIG. 3 provides a schematic view of a vehicle system 300. The vehicle system 300 includes a lead powered unit 310 and a remote powered unit 350. Commands from the lead powered unit 310 are used to control tractive efforts of the remote powered unit 350.

The lead powered unit 310 includes a control processing unit 312, a position identification module 314, an operating information module 316, and a central management processing unit 320 disposed thereon. In the illustrated embodiment, the lead powered unit 310 is a lead locomotive. The remote powered unit 350 includes an operating information system 360 and a location information system 370 disposed thereon. In the illustrated embodiment, the remote powered unit 350 is a remote locomotive. In the illustrated embodiment, one lead unit and one remote unit are depicted for simplicity and clarity. Other embodiments may include, for example, a larger number of remote units along with non-powered units. Further, for example, a fuel consumption analysis module may be disposed on a remote unit alternatively to or in addition to a fuel consumption analysis module disposed on the lead powered unit.

The fuel consumption analysis module 324 of the central management processing unit 320 uses information obtained by and transmitted from the position identification module 314, the operating information module 316, the operating information system 360, and the location information system 370 to determine fuel consumption of the powered units, for example a lead locomotive and one or more remote locomotives. In the illustrated embodiment, the energy management module 322 of the central management processing unit 320 also develops a trip plan for a trip of the vehicle system 300 including both the lead powered unit 310 and the remote powered unit 350 to travel to a scheduled destination location at a scheduled arrival time. The trip plan may include throttle settings, brake settings, designated speeds, or the like, of the lead powered unit 310 and the remote powered unit 350 for various sections of the trip of the vehicle system 300. For example, the trip plan can include one or more velocity curves that designate various speeds of the vehicle system 300 along various sections of a route.

The trip plan can be formed based on a trip profile associated with an upcoming trip of the vehicle system 300. The trip profile can include information related to the vehicle system 300, the routes over which the vehicle system 300 will traverse during the upcoming trip, and/or other information. The information related to the vehicle system 300 can include, for example, the tractive energy generated by powered units 310, 350 in the vehicle system 300, the weight or mass of the vehicle system 300 and/or cargo being carried by the vehicle system 300, the length and/or other size of the vehicle system 300 (e.g., how many powered and non-powered units are mechanically coupled with each other in the vehicle system 300), and the like. The information related to the route can include the curvature, grade (e.g., inclination), existence of ongoing repairs, speed limits, and the like, for one or more sections of the route. The other information can include information related to conditions that impact how much fuel the vehicle system 300 consumes while traveling, such as the air pressure, temperature, humidity, and the like. The central management processing system 320 may provide the trip plan to the control processing system 312, which in turn then may form the control signals based on the trip plan.

The lead powered unit 310 includes a control processing system 312 and a central management processing unit 320 disposed thereon. In the illustrated embodiment, two separate processing units are depicted as disposed on-board the lead powered unit 310. One, the control processing system 312, is configured for control of the vehicle system 300, while the other, the central management processing unit 320 is configured for both trip planning and fuel consumption analysis.

In the illustrated embodiment, the central management processing unit 320 includes an energy management module 322 and a fuel consumption module 324. Thus, in the illustrated embodiment, one processing unit is shared by the fuel consumption analysis module 324 as well as an energy management module 322. In other embodiments, other arrangements are employed. For example, the fuel analysis module may have a separate processing unit dedicated for use with the fuel analysis module alone.

The central management processing unit 320 receives information regarding the operation and position of the lead unit 310 (on which the central management processing unit 320 is disposed) from the position identification module 314 and the operating information module 316 also disposed on-board the lead unit 310. The position identification module 314 and the operating information module 316 are communicatively joined to the central management processing unit 320. One or both of the position identification module 314 and the operating information module 316 may be dedicated for use solely with the fuel consumption analysis module 324 of the central management processing unit, or one or both may be shared with other aspects of the lead unit 310 or vehicle system 300.

For example, in the illustrated embodiment, the operating information module 316 may be a part of or otherwise associated with a dynamic braking system, and may provide information relating to the operation (e.g., railroad identification, locomotive road number (an identification of an individual powered unit), traction/dynamic brake status and tractive/dynamic brake effort) of the lead locomotive to other powered units in a vehicle system and/or an event recorder pursuant to federal railroad regulations. The central management processing unit 320 uses the information obtained from the operating information module 316 to determine the fuel consumed by the lead powered unit 310. The fuel consumed by the lead powered unit 310 may be combined with the fuel consumed by the remote powered unit 350 (along with fuel consumed by any other remote units in the vehicle system 300) to determine a total amount of fuel consumed by the vehicle system 300. (In other embodiments, operational information of a powered unit generally, such as a railroad identification and/or locomotive road number, which might be communicated over a DB modem (see below), may be used by a fuel analysis module as part of a basis for determining fuel consumption, e.g., the railroad identification number, locomotive number, or other operational information identifying or describing a powered unit, may be used to look up individual fuel burn rates for each locomotive or other powered unit in a consist.)

Further, in the illustrated embodiment, the location information module 314 may be a GPS receiver that provides information to other aspects of the lead powered unit 310 or vehicle system 300. The fuel consumption analysis module 324 of the central management processing unit 320 uses the information obtained from the location information module 314 to determine the fuel consumed by the lead powered unit 310. For example, fuel consumption analysis module 324 of the central management processing unit 320 may use information from the location information module 314 to identify when the vehicle system 300 (or particular portions of the vehicle system 300) pass by one or more predetermined locations defining a boundary of a segment or a trip for which a fuel consumption total is desired. For example, the fuel consumed by the lead powered unit 310 may be combined with the fuel consumed by the remote powered unit 350 (along with fuel consumed by any other remote units in the vehicle system 300) starting at one point and ending at another point to determine a total amount of fuel consumed by the vehicle system 300 as it travels between those two points.

The remote powered unit 350 includes an operating information system 360 and a location information system 370. The operating information system 360 obtains and transmits information regarding the operation of the remote powered unit 350 to the lead powered unit 310, and the location information system 370 obtains and transmits information regarding the location of the remote powered unit 350 the lead powered unit 370.

In the illustrated embodiment, the operating information system 360 of the remote powered unit 350 includes an operating information collection unit 362 and an operating information transmitter 364. In the illustrated embodiment, the operating information collection unit 362 is associated with a dynamic braking system and the operating information transmitter 364 is a DB modem. The DB modem, in addition to providing operating information to the central management processing unit 320 also provides information to the control processing unit 312. Further, the DB modem may provide information to all powered units of a vehicle system. Thus, in embodiments, the operating information collection unit may be shared, for example, by the fuel consumption analysis module and other aspects of the lead powered unit or of the vehicle system.

Also, in the illustrated embodiment, the location information system 370 of the remote powered unit 350 includes a location information collection unit 372 and a location information transmitter 374. In the illustrated embodiment, the location information collection unit 372 is a GPS receiver disposed on-board the remote unit 350, and the location information transmitter 374 is a GPS modem. The GPS modem, in addition to providing location information to the central management processing unit 320 also provides information to the control processing unit 312. Thus, in embodiments, the location information collection unit may be shared, for example, by the fuel consumption analysis module and other aspects of the lead powered unit or vehicle system.

Figure 4:
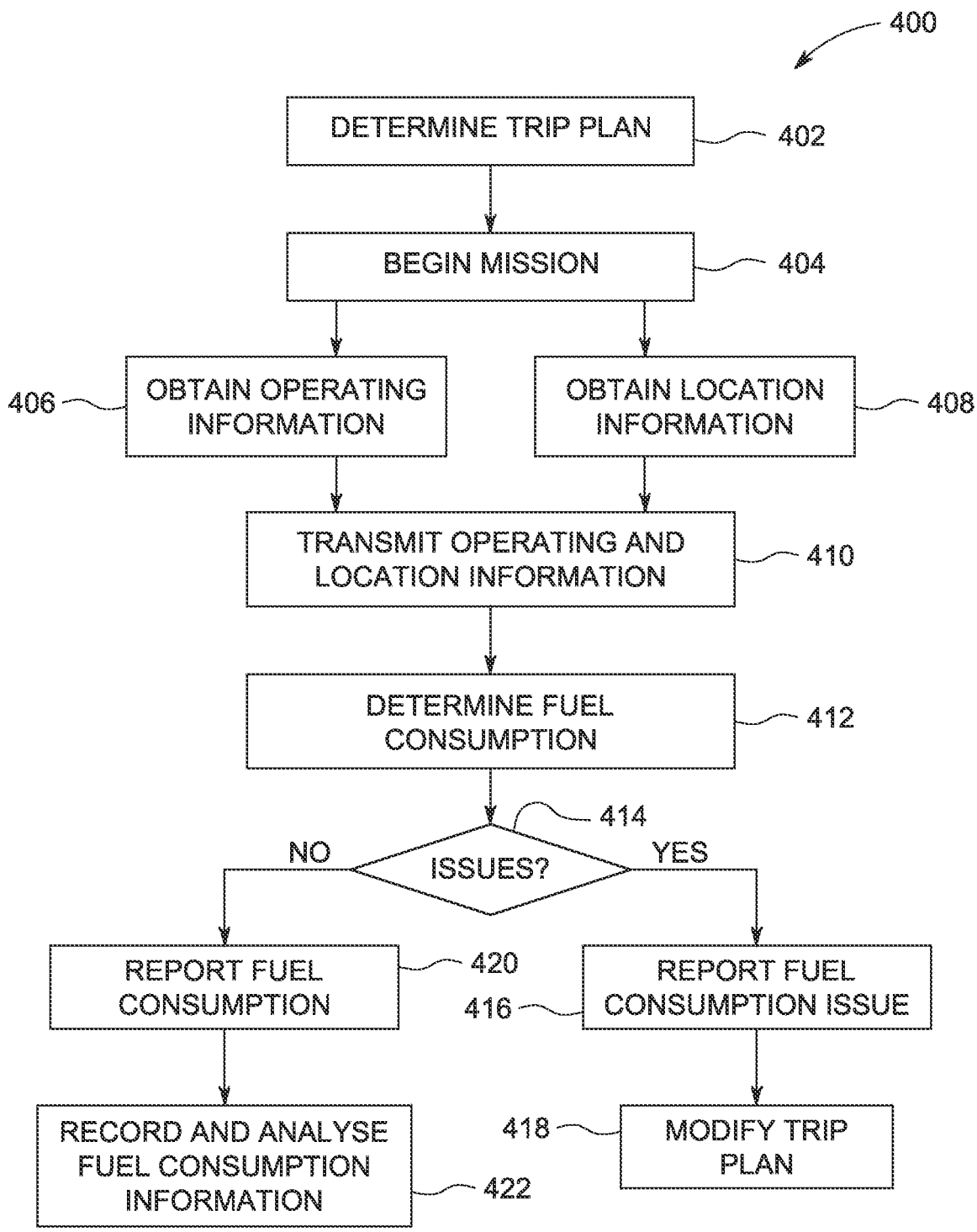
FIG. 4 is a flowchart of one embodiment of a method for determining fuel consumption.

FIG. 4 is a flowchart of one embodiment of a method 400 for determining fuel consumption by a vehicle. The method 400 may be performed, for example, using certain components, equipment, structures, or other aspects of embodiments discussed above. In certain embodiments, certain steps may be added or omitted, certain steps may be performed simultaneously or concurrently with other steps, certain steps may be performed in different order, and certain steps may be performed more than once, for example, in an iterative fashion. In some embodiments the steps may be performed repeatedly, either at predetermined intervals, or substantially continuously, to provide a current running total of fuel consumed. In some embodiments, certain steps may be performed during a mission and other steps performed after a mission is completed.

At 402, a trip plan is determined. For example, the trip plan may be determined based on scheduling requirements using a trip profile as described above. In embodiments, the trip plan is determined on-board using an energy management module. The trip plan, for example, sets forth tractive efforts of a plurality of powered units of a vehicle system during performance of a mission. At 404, the trip or mission is begun. The trip plan may also be modified or updated during performance of the mission. In embodiments, fuel consumption may be analyzed without a trip plan. For example, a system may calculate a fuel consumption based on information collected during a trip, whether the trip is performed pursuant to or not pursuant to a trip plan.

At 406, operating information is obtained. The operating information describes actual operations undertaken during a trip or mission, or actual tractive or braking events recorded or collected during a trip or mission. Such operations may be consistent with or identical to operations set forth by the trip plan, or may differ from the trip plan. For example, tractive efforts undertaken by a powered unit may differ from a trip plan due to, for example, an unexpected stop or delay due to other consists on a network, or, as another example, due to an operator over-riding an automatic execution of a trip plan or otherwise deviating from a trip plan. The operating information, in embodiments, is collected at each powered unit and forwarded to the lead powered unit, where the operating information is processed on-board to determine fuel consumed by individual units as well as the entire vehicle system. The operating information, in embodiments, includes identification information identifying the particular powered unit from which a set of operating information is sent. In alternate embodiments, a remote powered unit may receive the operating information collected by the powered units. In still other embodiments, each powered unit may process its own operating information to determine the fuel consumed by that particular powered unit.

At 408, location information is obtained. The location information describes the geographic location or point along a route at which one or more powered units are located. For example, the location information may be obtained by a GPS receiver as discussed above. In embodiments, the location information is obtained for each powered unit of a vehicle system. The location information may be obtained substantially concurrently with the operating information.

At 410, the operating information and the location information are forwarded to a fuel consumption analysis module of the lead powered unit of the vehicle system. The fuel consumption analysis module may, as one example, have a processing unit dedicated to fuel consumption analysis, or, as another example, may share a processing unit with, for example, an energy management module configured to determine and/or modify a trip plan. In other embodiments, the operating information and location information may instead be transmitted to a designated remote unit of a vehicle system for processing or analysis to determine fuel consumption.

In embodiments, the location information and operating information are sent separately from each other. For example, the operating information may be sent via a DB modem of a dynamic braking system, and the location information sent via a GPS modem. In other embodiments, the location information and operating information may be sent together or via a shared modem. Further, the operating information and location information may be also sent to other aspects of a lead powered unit. For example, the operating and/or location information may be transmitted to a control system and/or an event recorder in addition to being transmitted to the fuel consumption analysis module. In embodiments, the operating information and location information are transmitted substantially continuously (e.g., at very small time intervals) and substantially concurrently to the fuel consumption analysis unit. As the information is collected internally by the vehicle system during a mission and transmitted concurrently, difficulties with correlation of time stamps with device outside of the vehicle system (for example, one or more AEI readers) are avoided.

At 412, the fuel consumption is determined. Fuel consumed may be determined for individual powered units, groups of powered units, and/or a total of all powered units in a vehicle system. Fuel consumption may be determined, for example, using a table describing fuel consumption rates for each individual powered unit at a given throttle setting or other measure of tractive effort. In embodiments, an on-board module determines fuel consumed substantially continuously during performance of a mission, with information. In other embodiments, an on-board module determines fuel consumed at one or more pre-determined intervals, for example after a vehicle system has traveled a predetermined time or distance, or as another example, at predetermined locations during a mission, such as at a halfway point of a mission, or, as another example, at the end of a mission. Alternatively or additionally, information collected and/or consumption information determined during a trip may be saved and examined retrospectively after a trip to determine fuel consumption for one or more of the powered units for all and/or a portion of the mission. The fuel consumed may be determined, for example, as a running total of fuel consumed during the mission for individual powered units as well as for the entire vehicle system.

At 414, it is determined if there are any issues with fuel consumption on-board the vehicle system, and if such issues may be resolved. If any such issues are satisfactorily resolved, the method may proceed to 420. If not, the method may proceed to 416. In embodiments, fuel consumption may be reported at 420 substantially concurrently with the addressing of fuel consumption issues.

For example, the fuel consumption analysis module may determine, using a list of powered units in the vehicle system, that one or more powered units did not transmit operation information. If, for example, the information was not transmitted because the powered unit(s) not transmitting were shut down pursuant to a predetermined plan or otherwise known to have been shut down, then the potential issue may be considered resolved. If, as another example, it is determined that the powered unit(s) not reporting were indeed still operating under power, or if such a determination cannot be known for certain, then any fuel consumption determined during the mission may be flagged as questionable, and not used in subsequent comparative analyses with fuel consumption from other missions.

As another example, by analyzing the fuel consumption of a particular powered unit during a trip compared with known information regarding the quantity of fuel available to the particular powered unit at the beginning of the trip, the fuel consumption analysis module may determine that a particular powered unit is running low on fuel. If such a determination is made, for example, an alert may be provided to an operator and/or a dispatcher regarding the low fuel situation. In embodiments, if a low fuel situation is determined, the method proceeds to 416.

At 416, fuel consumption issues are reported. For example, the status of one or more powered units, along with an identification of the one or more powered units, may be transmitted to, for example, an energy management module including a trip planner. As another example, if the fuel consumption for all or a substantial portion of a vehicle system is exceeding the expected fuel consumption, the trip planner may be notified. At 418, the trip planner modifies the trip plan to accommodate the fuel consumption issue reported to the trip planner. For example, the trip planner may schedule a previously unscheduled fuel stop to obtain more fuel. As another example, the trip planner may shift tractive efforts away from a powered unit experiencing a fuel shortage and to an appropriate alternate powered unit or units that have ample fuel. For example, a powered unit having a fuel shortage may be shut down or run at a lower throttle setting to conserve fuel for that particular powered unit, while one or more other powered units in the vehicle system are run at a higher throttle setting. As another example, the trip planner may revise the trip plan to perform the mission at a slower speed for all or a part of a mission, for example for a part of the mission until more fuel may be obtained. Thus, a trip plan may be modified on-board, for example autonomously, using information provided by a fuel consumption analysis performed on-board. In embodiments, the method may then proceed to 420 and/or return to 406 and 408.

At 420, the fuel consumption is reported to an off-board analysis system. For example, fuel consumed for all and/or a portion of a mission may be provided to a scheduling system. Such information may also be provided, for example, to a fuel analysis station or system, where the information may be used to determine the effectiveness of fuel efficiency technologies or initiative utilized during the mission. The fuel consumption may be reported, for example, autonomously by the lead powered unit at or near completion of a mission or one or more predetermined segments or portions of the mission. For example, the fuel consumption information for a particular mission or segment of a mission may also include information identifying any fuel efficiency technologies or initiatives employed during the particular mission or segment of the mission. In embodiments, the fuel consumption may be reported during a mission responsive to a request from, for example, a dispatcher associated with a scheduling system or an analyst associated with an off-board fuel consumption analysis system, providing up-to-date fuel consumption information on an "on-demand" basis. The reported fuel consumption information may also include, for example, raw or unprocessed data including location information correlated with operating information that may be analyzed retrospectively after a mission. For example, the raw data may be queried or otherwise sorted to determine fuel consumption for a segment of interest of the mission that was not identified as a segment of interest before or during the mission.

At 422, the fuel consumption information is recorded and analyzed. For example, the fuel consumption information may be evaluated to determine the effectiveness of different fuel saving technologies or initiatives. In embodiments, such an analysis may be performed on-board and subsequently transmitted to a scheduling or off-board analysis station. For example, an expected fuel consumption may be computed before or during the trip, and the on-board fuel consumption analysis module, after determining the fuel actually consumed during the trip using the operating information describing the actual throttle settings used during the trip, may compare the actual fuel consumed (for example, the actual fuel consumed using a fuel saving initiative being studied) to the expected fuel consumed (for example, the expected fuel consumption with the fuel saving initiative being studied and/or the expected fuel consumption without the fuel saving initiative). In embodiments, the fuel consumption information is studied by an off-board system, for example, by comparing the fuel consumption information for one mission with fuel consumption information for a plurality of separately performed missions.

In an embodiment, fuel consumption (e.g., fuel consumption rates, total fuel consumed, or the like) of a vehicle consist (or portion thereof, i.e., a vehicle or vehicles within the consist) for at least a portion of a mission of the vehicle consist is determined based on operating information of the vehicle consist. The operating information may relate to one or more of tractive events or braking events of the vehicle consist (or portion thereof), during the mission (or portion thereof). The information of tractive events and/or braking events may include information of vehicles in the consist being in an idle mode (while the vehicle consist is moving or otherwise), or being partially or fully powered off (e.g., when the vehicle consist is moving, such as might be the case when the vehicle is controlled to an off or other lower power mode to conserve energy during times when the vehicle is not needed to contribute to propulsion). In embodiments, the information of tractive events and/or braking events, used for determining the fuel consumption, includes only information of propulsive throttle events (events that result in vehicle propulsion) and/or braking applications, and/or only information of powered units in the consist that are contributing to propulsion, which might be done when it is desired to look at fuel consumption only of vehicles contributing to consist propulsion or braking.

In one embodiment, a system (e.g., for autonomously determining fuel consumption) includes a vehicle control module, an operating information module, and a fuel analysis module. The vehicle control module is configured to be disposed on-board a vehicle and to obtain operating information that designates one or more tractive operations or braking operations of the vehicle during the trip. The operating information module is configured to be disposed on-board the vehicle and to autonomously obtain operating information describing one or more of tractive events or braking events performed during the trip. The fuel analysis module is configured to be disposed on-board the vehicle and to receive the operating information from the operating information module. The fuel analysis module is also configured to autonomously determine a fuel consumption for at least a portion of the trip using the operating information received from the operating information module.

In another aspect, the system further includes a location module configured to be disposed on-board the vehicle and communicatively coupled with the fuel analysis module. The location module is configured to determine location information describing one or more locations of the vehicle during the trip. The fuel analysis module is configured to receive the location information from the location module during the trip and use the location information to determine the fuel consumption for at least a portion of the trip. In embodiments, the location module includes a GPS receiver, and the fuel analysis module is configured to determine the fuel consumption between first and second predetermined location identified using GPS position information. Further, in embodiments, the fuel analysis module is configured to determine a plurality of segment fuel consumption totals. The segment fuel consumption totals correspond to fuel consumed between corresponding segment beginning and end points that represent a portion of the trip.

In another aspect, the operating information module is communicatively coupled with the vehicle control module and configured to transmit the operating information to the vehicle control module.

In another aspect, the system further includes an energy management module configured to be disposed on-board the vehicle. The energy management module is configured to generate a trip plan that designates one or more tractive operations or braking operations of the vehicle during the trip for the vehicle control module. The energy management module is configured to be communicatively coupled with the fuel analysis module and to modify the trip plan using fuel consumption information from the fuel analysis module. In embodiments, the system includes a central management module that includes the energy management module and the fuel analysis module, wherein the energy management module and the fuel analysis module are configured to share a common processing unit.

In another aspect, the system includes a dynamic braking modem. The operating information module and the fuel analysis module are communicatively coupled via the DB modem.

In another aspect, the vehicle includes a rail vehicle consist that includes a lead powered unit and plurality of remote powered units. The operating information module is included in a set of plural operating information modules distributed among the lead powered unit and the remote powered units. In embodiments, each of the lead powered unit and the remote powered units have a designated operating information module disposed thereon.

In another aspect, the fuel analysis module is configured to determine the fuel consumption for the at least a portion of the trip during the trip.

In another embodiment, a method (e.g., for autonomously determining fuel consumption) includes obtaining operating information on-board a vehicle. The operating information describes one or more of tractive events or braking events during a mission being performed by the vehicle. The method also includes communicating the operating information to a fuel analysis module disposed on-board the vehicle. The method further includes determining, autonomously on-board the vehicle during the mission, a fuel consumption for at least a portion of the mission using the operating information.

In another aspect, the method includes obtaining, on-board the vehicle, location information describing one or more locations of the vehicle during the mission. The location information is used as part of the determining the fuel consumption for at least a portion of the mission. For example, determining the fuel consumption may be performed between first and second predetermined locations identified using GPS position information obtained on-board the vehicle. In embodiments, the method further includes determining a plurality of segment fuel consumption totals. The segment fuel consumption totals represent fuel consumed between corresponding segment beginning and end points that represent a portion of the mission.

In another aspect, the method further includes generating, on-board the vehicle, a trip plan for the vehicle. The trip plan designates one or more tractive operations or braking operations of the vehicle to perform the mission. The method also includes accessing fuel consumption information that has been determined on-board the vehicle during the mission, and modifying the trip plan using the fuel consumption information.

In another aspect, a dynamic braking modem is used for communicating the operating information to the fuel analysis module.

In another aspect, the vehicle includes a rail vehicle consist that includes a lead powered unit and a plurality of remote powered units. Obtaining operating information is performed via a set of plural operating information modules distributed among the lead powered unit and the remote powered units. In embodiments, each of the lead powered unit and the remote powered units have a designated operating information module disposed thereon.

In another embodiment, a tangible and non-transitory computer readable medium (e.g., for autonomously determining fuel consumption) includes one or more software modules configured to direct a processor to obtain operating information on-board a vehicle. The operating information describes one or more of tractive events or braking events during a mission being performed by the vehicle. The processor is also directed to communicate the operating information to a fuel analysis module disposed on-board the vehicle. Further, the processor is directed to determine, autonomously on-board the vehicle during the mission, a fuel consumption for at least a portion of the mission using the operating information.

In another aspect, the computer readable medium is further configured to direct the processor to obtain, on-board the vehicle, location information describing one or more locations of the vehicle during the mission. The location information is used as part of determining the fuel consumption for at least a portion of the mission. For example, the computer readable medium may be further configured to direct the processor to determine the fuel consumption between first and second predetermined locations identified using GPS position information obtained on-board the vehicle. In embodiments, the computer readable medium is further configured to direct the processor to determine a plurality of segment fuel consumption totals. The segment fuel consumption totals represent fuel consumed between corresponding segment beginning and end points that represent a portion of the mission.

In another aspect, the computer readable medium is further configured to direct the processor to generate, on-board the vehicle, a trip plan for the vehicle, access fuel consumption information that has been determined on-board the vehicle during the mission, modify the trip plan using the fuel consumption information. the trip plan designates one or more tractive operations or braking operations of the vehicle to perform the mission.

In another aspect, a dynamic braking modem is used to communicate the operating information to the fuel analysis module.

In another aspect, the vehicle includes a rail vehicle consist that includes a lead powered unit and a plurality of remote powered units. The computer readable medium is further configured to direct the processor to obtain the operating information via a set of plural operating information modules distributed among the lead powered unit and the remote powered units. In embodiments, each of the lead powered unit and the remote powered units have a designated operating information module disposed thereon.

In another embodiment, a system is provided including a DB modem disposed on-board a first vehicle of a vehicle consist and a fuel analysis module also disposed on-board the first vehicle. The fuel analysis module is configured to receive operating information from a second vehicle in the vehicle consist over a communication link established by the DB modem. The operating information describes one or more of actual tractive events or actual braking events performed by the second vehicle during a trip of the vehicle consist. The fuel analysis module is configured to autonomously determine a fuel consumption for at least a portion of the trip using the operating information from the second vehicle.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the inventive subject matter, and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, controllers or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the presently described inventive subject matter are not intended to be interpreted as excluding the existence of additional embodiments that also incorporate the recited features. Moreover, unless explicitly stated to the contrary, embodiments "comprising," "comprises," "including," "includes," "having," or "has" an element or a plurality of elements having a particular property may include additional such elements not having that property.

What is claimed is:

1. A system comprising:
an operating information module configured to be disposed on-board a vehicle and to autonomously obtain operating information describing the performance of one or more of actual tractive events or actual braking events actually performed by the vehicle during a trip of the vehicle, the operating information recorded during the trip, the operating information including timing information describing an amount of time spent at one or more throttle settings during the trip; and
a fuel analysis module configured to be disposed on-board the vehicle and to receive the operating information from the operating information module during the trip, the fuel analysis module also configured to autonomously determine, during the trip, an actual fuel consumption for at least a portion of the trip using the operating information received from the operating information module, wherein the fuel analysis module is configured to determine the actual fuel consumption based on the amount of time spent at the one or more throttle settings recorded during the trip.

2. The system of claim 1, further comprising a location module configured to be disposed on-board the vehicle and communicatively coupled with the fuel analysis module, the location module configured to determine location information describing one or more locations of the vehicle during the trip, wherein the fuel analysis module is configured to receive the location information from the location module during the trip and use the location information to determine the fuel consumption for at least a portion of the trip, and wherein the location information and the operating information are transmitted over different communicative pathways.

3. The system of claim 2, wherein the location module comprises a global positioning system (GPS) receiver, wherein the fuel analysis module is configured to determine the fuel consumption between first and second predetermined locations identified using GPS position information.

4. The system of claim 1, wherein the fuel analysis module is configured to determine a plurality of segment fuel consumption totals, the segment fuel consumption totals corresponding to fuel consumed between corresponding segment beginning and end points that are representative of a portion of the trip.

5. The system of claim 1, wherein the operating information module is communicatively coupled with a vehicle control module and configured to transmit the operating information to the vehicle control module, the vehicle control module configured to be disposed on-board the vehicle and to obtain a trip plan for the vehicle that designates one or more tractive operations or braking operations to be implemented by the vehicle during the trip.

6. The system of claim 1, further comprising an energy management module configured to be disposed on-board the vehicle, the energy management module configured to generate a trip plan that designates one or more tractive operations or braking operations to be implemented by the vehicle during the trip for a vehicle control module, the vehicle control module configured to be disposed on-board the vehicle and to obtain the trip plan for the vehicle, wherein the energy management module is configured to be communicatively coupled with the fuel analysis module and to modify the trip plan using fuel consumption information from the fuel analysis module.

7. The system of claim 6, further comprising a central management module that comprises the energy management module and the fuel analysis module, wherein the energy management module and the fuel analysis module are configured to share a common processing unit.

8. The system of claim 1, further comprising a dynamic braking (DB) modem configured to communicatively couple powered units of the vehicle with each other, wherein the operating information module and the fuel analysis module are communicatively coupled via the DB modem.

9. The system of claim 1, wherein the vehicle comprises a rail vehicle consist that includes a lead powered unit and a plurality of remote powered units, and wherein the operating information module is included in a set of plural operating information modules distributed among the lead powered unit and the remote powered units, each of the lead powered unit and the remote powered units having a designated operating information module disposed thereon.

10. The system of claim 1, wherein the fuel analysis module is configured to report the fuel consumption to an off-board system at least one of during or after the trip.

11. A method comprising:
recording, on-board a vehicle, during performance of a mission by a vehicle, operating information describing one or more of actual tractive events or actual braking events actually performed by the vehicle during a trip of the vehicle, wherein the operating information includes timing information describing an amount of time spent at one or more throttle settings during the trip;
communicating, during the mission, the operating information to a fuel analysis module disposed on-board the vehicle; and
determining, autonomously on-board the vehicle during performance of the mission, an actual fuel consumption for at least a portion of the mission using the amount of time spent at the one or more throttle settings recorded during the trip.

12. The method of claim 11, further comprising obtaining, on-board the vehicle, location information describing one or more locations of the vehicle during the mission, wherein the location information is used as part of the determining the fuel consumption for at least the portion of the mission.

13. The method of claim 12, wherein the determining the fuel consumption is performed between first and second predetermined locations identified using global positioning system (GPS) position information obtained on-board the vehicle.

14. The method of claim 11, further comprising determining a plurality of segment fuel consumption totals that represent fuel consumed between corresponding segment beginning and end points that represent a portion of the mission.

15. The method of claim 11, further comprising:
generating, on-board the vehicle, a trip plan for the vehicle, the trip plan designating one or more tractive operations or braking operations of the vehicle to perform the mission;
accessing information of the fuel consumption that has been determined on-board the vehicle during the mission; and
modifying the trip plan using the information.

16. The method of claim 11, wherein a dynamic braking (DB) modem configured to communicatively couple powered units of the vehicle with each other is used for the communicating the operating information to the fuel analysis module.

17. The method of claim 11, wherein the vehicle comprises a rail vehicle consist that includes a lead powered unit and a plurality of remote powered units, and wherein the obtaining operating information is performed via a set of plural operating information modules distributed among the lead powered unit and the remote powered units, each of the lead powered unit and the remote powered units having a designated operating information module disposed thereon.

18. A tangible and non-transitory computer readable medium comprising one or more computer software modules configured to direct a processor to:
record, on-board a vehicle, during performance of a mission by a vehicle, operating information describing one or more of actual tractive events or actual braking events actually performed by the vehicle during a trip of the vehicle, wherein the operating information includes timing information describing an amount of time spent at one or more throttle settings during the trip;
communicate, during the mission, the operating information to a fuel analysis module disposed on-board the vehicle; and
determine, autonomously on-board the vehicle during the mission, an actual fuel consumption for at least a portion of the mission using the amount of time spent at the one or more throttle settings recorded during the trip.

19. The computer readable medium of claim 18, wherein the computer readable medium is further configured to direct the processor to obtain, on-board the vehicle, location information describing one or more locations of the vehicle during the mission, wherein the location information is used as part of determining the fuel consumption for at least the portion of the mission.

20. The computer readable medium of claim 19, wherein the computer readable medium is further configured to direct the processor to determine the fuel consumption between first and second predetermined locations identified using global positioning system (GPS) position information obtained on-board the vehicle.

21. The computer readable medium of claim 18, wherein the computer readable medium is further configured to direct the processor to determine a plurality of segment fuel consumption totals that represent fuel consumed between corresponding segment beginning and end points that represent a portion of the mission.

22. The computer readable medium of claim 18, wherein the computer readable medium is further configured to direct the processor to:
generate, on-board the vehicle, a trip plan for the vehicle, the trip plan designating one or more tractive operations or braking operations of the vehicle to perform the mission;
access information of the fuel consumption that has been determined on-board the vehicle during the mission; and
modify the trip plan using the information.

23. The computer readable medium of claim 18, wherein a dynamic braking (DB) modem configured to communicatively couple powered units of the vehicle with each other is used to communicate the operating information to the fuel analysis module.

24. The computer readable medium of claim 18, wherein the vehicle comprises a rail vehicle consist that includes a lead powered unit and a plurality of remote powered units, and wherein the computer readable medium is further configured to direct the processor to obtain the operating information via a set of plural operating information modules distributed among the lead powered unit and the remote powered units, each of the lead powered unit and the remote powered units having a designated operating information module disposed thereon.

25. A system comprising:
- a communication link configured to communicatively couple a first vehicle of a vehicle consist with at least one additional powered unit of the vehicle consist; and
- a fuel analysis module disposed on-board the first vehicle, the fuel analysis module configured to receive operating information from a second vehicle in the vehicle consist over the communication link, the operating information describing one or more of actual tractive events or actual braking events performed by the second vehicle during a trip of the vehicle consist, the operating information including timing information describing an amount of time spent at one or more throttle settings during the trip, the fuel analysis module configured to autonomously determine a fuel consumption for at least a portion of the trip using the operating information from the second vehicle, wherein the fuel analysis module is configured to determine the actual fuel consumption based on the amount of time spent at the one or more throttle settings recorded during the trip.

* * * * *